US009880347B2

(12) United States Patent
Guo et al.

(10) Patent No.: US 9,880,347 B2
(45) Date of Patent: Jan. 30, 2018

(54) RADIATOR, BACKLIGHT MODULE AND DISPLAY MODULE

(71) Applicant: SHENZHEN TCL NEW TECHNOLOGY CO., LTD, Shenzhen, Guangdong (CN)

(72) Inventors: Dongming Guo, Guangdong (CN); Kewen Qiang, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 187 days.

(21) Appl. No.: 15/026,972

(22) PCT Filed: Dec. 11, 2014

(86) PCT No.: PCT/CN2014/093629
§ 371 (c)(1),
(2) Date: Apr. 2, 2016

(87) PCT Pub. No.: WO2016/015428
PCT Pub. Date: Feb. 4, 2016

(65) Prior Publication Data
US 2016/0282547 A1 Sep. 29, 2016

(30) Foreign Application Priority Data

Jul. 30, 2014 (CN) ..................... 2014 2 0427304 U

(51) Int. Cl.
*F21V 8/00* (2006.01)
*F21V 29/56* (2015.01)
(Continued)

(52) U.S. Cl.
CPC .......... *G02B 6/0085* (2013.01); *F21V 29/503* (2015.01); *F21V 29/51* (2015.01);
(Continued)

(58) Field of Classification Search
CPC ..... G02B 6/0085; G02B 6/0068; F21V 29/51; F21V 29/503; F21V 29/56; G02F 1/133382
See application file for complete search history.

(56) References Cited

U.S. PATENT DOCUMENTS 6,808,015 B2 * 10/2004 Osakabe ............. F28D 15/0233
165/104.21
7,624,789 B2 * 12/2009 Minamitani ............ G06F 1/203
165/104.33

(Continued)

FOREIGN PATENT DOCUMENTS

| CN | 102691999 A | 9/2012 |
| CN | 103672814 A | 3/2014 |

OTHER PUBLICATIONS

International Search Report of PCT Patent Application No. PCT/CN2014/093629 dated May 6, 2015.

*Primary Examiner* — Joseph L Williams
*Assistant Examiner* — Jose M Diaz

(57) ABSTRACT

The present invention discloses a radiator, where the radiator includes a mounting portion used for mounting a heat source, a radiating portion connected with the mounting portion and used for absorbing heat transferred by the mounting portion, the radiating portion is internally provided with multiple radiating pipelines, the radiating pipelines are internally injected with liquid, and the liquid in the radiating pipelines is gasified after absorbing heat on one end where the radiating portion is close to the mounting portion, and in the radiating pipelines, moves from one end where the radiating portion is close to the mounting portion towards one end where the radiating portion is away from the mounting portion. The present invention further discloses a backlight module, and the present invention further discloses a display module. The present invention effectively (Continued)

improves the heat transfer effect, and effectively enhances the radiating effect.

20 Claims, 2 Drawing Sheets

(51) Int. Cl.
*F21V 29/503* (2015.01)
*F21V 29/51* (2015.01)
*G02F 1/1335* (2006.01)
*G02F 1/1333* (2006.01)

(52) U.S. Cl.
CPC ........ *F21V 29/56* (2015.01); *G02F 1/133308* (2013.01); *G02F 1/133385* (2013.01); *G02F 1/133615* (2013.01); *G02B 6/0068* (2013.01); *G02F 1/133382* (2013.01); *G02F 2001/133314* (2013.01); *G02F 2001/133628* (2013.01)

(56) References Cited

U.S. PATENT DOCUMENTS

| | | | |
|---|---|---|---|
| 8,009,427 B2* | 8/2011 | Iwata | H05K 7/20981 165/104.33 |
| 8,760,865 B2* | 6/2014 | Tang | G06F 1/20 165/104.33 |
| 8,864,335 B2* | 10/2014 | Nozawa | G02F 1/133603 362/218 |
| 9,303,886 B2* | 4/2016 | Wang | F24F 6/025 |
| 2003/0011983 A1* | 1/2003 | Chu | G06F 1/203 361/679.47 |
| 2007/0063338 A1* | 3/2007 | Chang | G02F 1/133603 257/714 |
| 2007/0147045 A1* | 6/2007 | Kimura | G02F 1/133603 362/294 |
| 2010/0163212 A1* | 7/2010 | Chin | F28D 15/0266 165/104.26 |
| 2012/0229726 A1* | 9/2012 | Kim | G02F 1/1336 349/58 |
| 2012/0293535 A1* | 11/2012 | Nozawa | G02F 1/133603 345/589 |
| 2012/0320566 A1* | 12/2012 | Namekata | G02F 1/133603 362/97.3 |
| 2015/0305199 A1* | 10/2015 | Yu | H01L 23/427 362/611 |

* cited by examiner

RADIATOR, BACKLIGHT MODULE AND DISPLAY MODULE

BACKGROUND

Technical Field

The present invention relates to the field of radiating devices, and in particular, to a radiator, a backlight module and a display module.

Related Art

Compared with a backlight module with two short sides, a backlight module with a single short side, due to decrease of the number of the LED lamps and decrease of the number of the radiator, reduces the cost of the backlight module, and also avoids the problem of light leak of liquid crystal glass caused by deformation and bulge of the light guide plate of the backlight module with two short sides, and thus the solution of backlight with a single short side is widely applied to TV design.

As the number of the LED lamps in the backlight module with a single short side is reduced, it is necessary to increase power of the single LED lamp to meet the brightness requirement of the whole machine, this causes the power of the single LED lamp to be too great, radiation to be difficult and the temperature to be very high, and the life of the LED is reduced. Radiation of the common backlight module with a single short side is pasting a LED light bar to a wide and thicker profile radiator and then affixing the LED light bar onto the back plate, the thicker radiator causes the thickness of the TV to become large, affecting the appearance and not conductive to thinning. Moreover, the cost of the radiator is generally very high, the heat is limited to the root of the radiator, radiation is not smooth, it is easy to heat the front frame of the display module, scald easily occurs when the front frame is touched, and a potential safety hazard exists.

SUMMARY

A main objective of the present invention is to solve the technical problem that the existing radiator does not have a good radiating effect.

To achieve the foregoing objective, the present invention provides a radiator, wherein the radiator includes a mounting portion used for mounting a heat source, a radiating portion connected with the mounting portion and used for absorbing heat transferred by the mounting portion, the radiating portion is internally provided with multiple radiating pipelines, the radiating pipelines are internally injected with liquid, and the liquid in the radiating pipelines is gasified after absorbing heat on one end where the radiating portion is close to the mounting portion, and in the radiating pipelines, moves from one end where the radiating portion is close to the mounting portion towards one end where the radiating portion is away from the mounting portion.

Preferably, the radiating pipelines include a main pipeline unit disposed at the one end where the radiating portion is close to the mounting portion, multiple sub-pipeline units in communication with the main pipeline unit and a liquid injection pipeline in communication with the sub-pipeline units and located on the one end where the radiating portion is away from the mounting portion.

Preferably, the multiple sub-pipeline units are spaced apart.

Preferably, the profile of each of the sub-pipeline units is honeycomb-like.

In addition, to achieve the foregoing objective, the present invention further provides a backlight module, wherein the backlight module includes a body, and a radiator mounted into the body, the radiator includes a mounting portion used for mounting a heat source, and a radiating portion connected with the mounting portion and used for absorbing heat transferred by the mounting portion, the radiating portion is internally provided with multiple radiating pipelines, the radiating pipelines are internally injected with liquid, and the liquid in the radiating pipelines is gasified after absorbing heat on one end where the radiating portion is close to the mounting portion, and in the radiating pipelines, moves from one end where the radiating portion is close to the mounting portion towards one end where the radiating portion is away from the mounting portion.

Preferably, the body includes a back plate, a backlight source mounted in the back plate, and a light guide plate mounted in the back plate, the radiator is mounted on the back plate, and the backlight source is mounted on the radiator.

Preferably, the backlight source is glued to the radiator through a radiating glue.

Preferably, the backlight source is a linear LED light bar, the LED light bar includes a PCB board and multiple LED lamps mounted and electrically connected to the PCB board, and the PCB board is glued to the radiator through the radiating glue.

Preferably, the backlight module further includes a plastic frame mounted onto the back plate.

In addition, to achieve the foregoing objective, the present invention further provides a display module, wherein the display module includes a backlight module, a display panel mounted onto the backlight module, and a front frame mounted onto the display panel; the backlight module includes a body, and a radiator mounted in the body, the radiator includes a mounting portion used for mounting a heat source, and a radiating portion connected with the mounting portion and used for absorbing heat transferred by the mounting portion, the radiating portion is internally provided with multiple radiating pipelines, the radiating pipelines are internally injected with liquid, and the liquid in the radiating pipelines is gasified after absorbing heat on one end where the radiating portion is close to the mounting portion, and in the radiating pipelines, moves from one end where the radiating portion is close to the mounting portion towards one end where the radiating portion is away from the mounting portion.

The radiator, the backlight module and the display module of the present invention, by injecting liquid into the radiating pipelines of the radiator, wherein the liquid is gasified after absorbing heat and moves in the radiating pipelines, achieves transfer of the heat, effectively improves the heat transfer effect, and effectively enhances the radiating effect.

The objective implementation, functional characteristics and advantages of the present invention are further described with reference to the accompanying drawings in combination with embodiments.

DETAILED DESCRIPTION

It should be understood that the specific embodiments described herein are merely used to explain the present invention, but are not used to limit the present invention.

The present invention provides a radiator.

Figure 1:
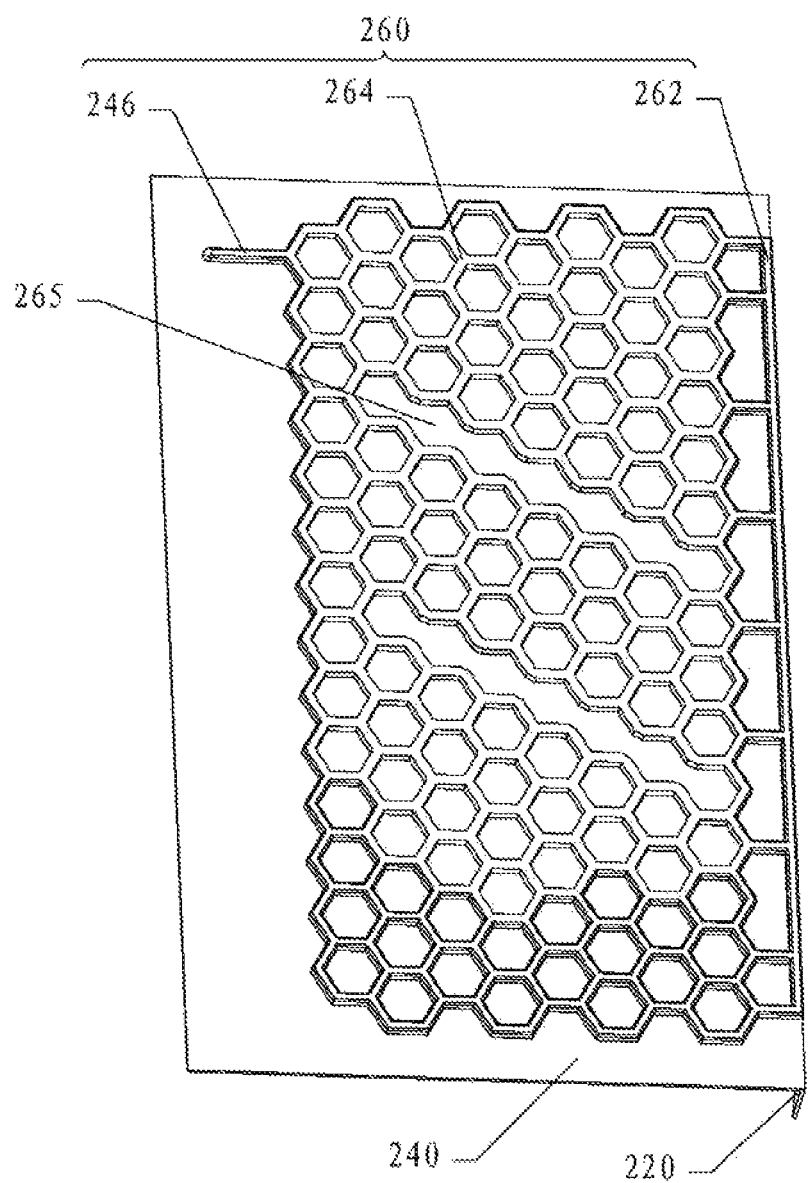
FIG. 1 is a three-dimensional schematic structural diagram of a radiator according to the present invention.

Referring to FIG. 1, FIG. 1 is a three-dimensional schematic structural diagram of a radiator according to the present invention.

In one embodiment, the radiator includes a mounting portion 220 used for mounting a heat source, and a radiating portion 240 connected with the mounting portion 220 and used for absorbing heat transferred by the mounting portion 220, the radiating portion 240 is internally provided with multiple radiating pipelines 260, the radiating pipelines 260 are internally injected with liquid, and the liquid in the radiating pipelines 260 is gasified after absorbing heat on one end where the radiating portion 240 is close to the mounting portion 220, and in the radiating pipelines 260, moves from one end where the radiating portion 240 is close to the mounting portion 220 towards one end where the radiating portion 240 is away from the mounting portion 220, to achieve transfer of the heat. Specifically, after the liquid in the radiating pipelines 260 absorbs heat and is gasified, the liquid is mixed with bubbles to form an oscillatory wave, the oscillatory wave moves along the radiating pipelines 260 and collides with pipe walls of the radiating pipelines 260 in the radiating pipelines 260, to exchange heat, and at the same time, oscillation is excited, to form a resonance wave, thus increasing a heat exchange speed, accelerating transfer of the heat to the distal end, and effectively reducing temperature gradient of the radiator.

In this embodiment, the radiator is formed by press fit of two aluminum plates at a certain temperature, specifically, a pipeline pattern is first designed on a surface of one aluminum plate, and a press-fit material is sprayed on the surface of the aluminum plate, then another aluminum plate is covered thereon, and the two aluminum plates are press-fit into a whole at a certain temperature, then are blown up into a designed radiating pipeline shape through high pressure gas charging, a small amount of liquid at certain pressure is fed into the radiating pipeline, an injection port is sealed then, and a bending operation is performed, to make an "L"-type radiator.

Specifically, the radiating pipelines 260 include a main pipeline unit 262 disposed at the one end where the radiating portion 240 is close to the mounting portion 220, multiple sub-pipeline units 264 in communication with the main pipeline unit 262 and a liquid injection pipeline 266 in communication with the sub-pipeline units 264 and located on the one end where the radiating portion 240 is away from the mounting portion 220. In this embodiment, there are three radiating pipelines 260, the three radiating pipelines 260 are spaced apart, that is, a gap 265 is disposed between two adjacent sub-pipeline units 264, to cause that heat of each sub-pipeline unit 264 will not be transferred to another sub-pipeline unit 264 adjacent thereto, thus avoiding the problem of uneven radiation.

Further, in this embodiment, the profile of each of the sub-pipeline units 264 is honeycomb-like, that is, the sub-pipeline unit 264 is formed by mutual communication of multiple hexagonal pipelines, effectively increasing the radiation area and improving the heat transfer effect.

The present invention further provides a backlight module.

Figure 2:
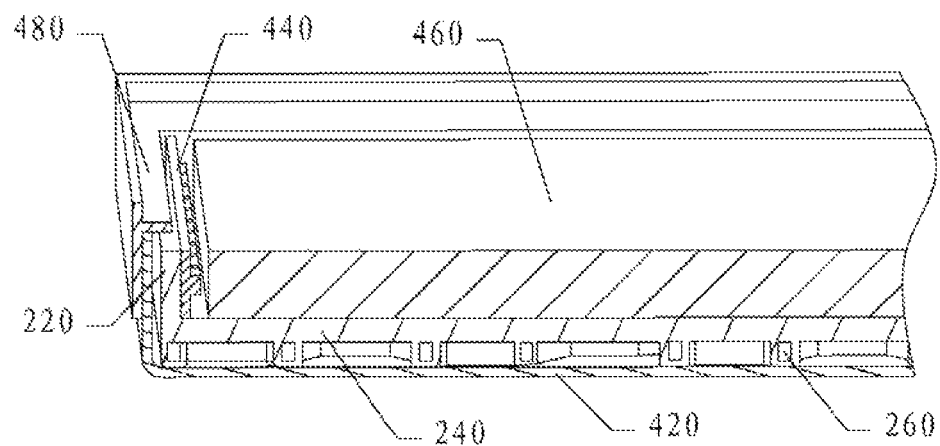
FIG. 2 is a three-dimensional schematic structural diagram of a backlight module according to the present invention.

Referring to FIG. 2, FIG. 2 is a three-dimensional schematic structural diagram of a backlight module according to the present invention.

In one embodiment, the backlight module includes a body, and a radiator mounted into the body, the radiator includes all the technical solutions in the embodiment shown in FIG. 1, and reference can be made to the aforementioned embodiment for its detailed structure and beneficial effects brought about, which are not repeated herein.

Further, in this embodiment, the body includes a back plate 420, a backlight source 440 mounted in the back plate 420, and a light guide plate 460 mounted in the back plate 420, the radiator is mounted on the back plate 420, and the backlight source 440 is mounted on the radiator.

Specifically, in this embodiment, the backlight module is a side backlight module, that is, the backlight source 440 is located on a side edge of the light guide plate 460. The radiating portion 240 of the radiator is fixed onto a bottom plate of the back plate 420 in a manner such as screw locking, and the backlight source 440 is mounted onto the mounting portion 220 on an in-light surface side. Heat produced by the backlight source 440 is transferred to the radiating portion 240 through the mounting portion 220, and the liquid in the radiating pipelines 260 located in the radiating portion 240 is gasified after absorbing the heat and, in the radiating pipelines 260, moves from one end where the radiating portion 240 is close to the mounting portion 220 towards one end where the radiating portion 240 is away from the mounting portion 220, to achieve transfer of the heat. Specifically, after the liquid in the radiating pipelines 260 absorbs heat and is gasified, the liquid is mixed with bubbles to form an oscillatory wave, the oscillatory wave moves along the radiating pipelines 260 and collides with pipe walls of the radiating pipelines 260 in the radiating pipelines 260, to exchange heat, and at the same time, oscillation is excited, to form a resonance wave, thus increasing a heat exchange speed, accelerating transfer of the heat to the distal end, effectively reducing temperature gradient of the radiator, thereby effectively lowering the temperature of the backlight source 440, and enhancing the service life of the backlight source 440.

Further, the backlight source 440 is fixed onto the radiator through adhesion, and preferably, the backlight source 440 is glued to the radiator through a radiating glue, to further enhance the heat transfer effect and reduce the temperature of the backlight source 440.

Further, the backlight source 440 is a linear LED light bar, the LED light bar includes a PCB board and multiple LED lamps mounted and electrically connected to the PCB board, and the PCB board is glued to the radiator through the radiating glue. The LED lamps emit light, and the light enters into the light guide plate 460 from an in-light surface of the light guide plate 460, propagates in the light guide plate 460, and is finally emitted out from an out-light surface of the light guide plate 460, to convert a point light source to a surface light source.

Further, the backlight module further includes a plastic frame 480 mounted onto the back plate 420, the plastic frame 480 is disposed above the back plate 420 and is provided with an opening corresponding to the out-light surface of the light guide plate 460, and when assembled into a display module, a display panel is disposed on the plastic frame 480 and the light guide plate 460 provides a surface light source for the display panel.

The present invention further provides a display module.

Figure 3:
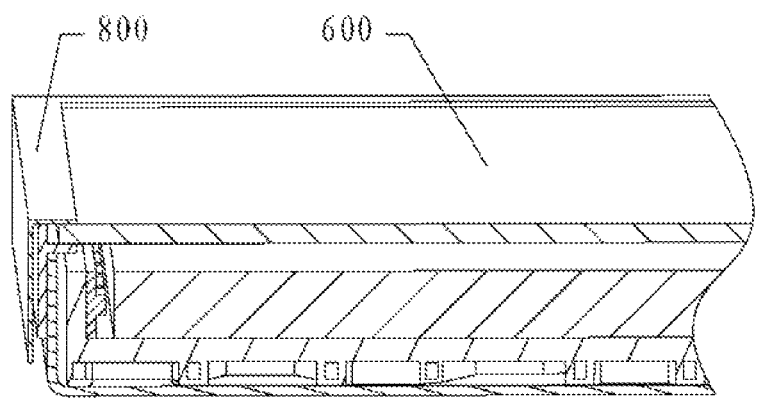
FIG. 3 is a three-dimensional schematic structural diagram of a display module according to the present invention.

Referring to FIG. 3, FIG. 3 is a three-dimensional schematic structural diagram of a display module according to the present invention.

The display module includes a backlight module, a display panel 600 mounted onto the backlight module, and a front frame 800 mounted onto the display panel 600, the backlight module includes all the technical solutions in the embodiment shown in FIG. 2, and reference can be made to the aforementioned embodiment for its detailed structure and beneficial effects brought about, which are not repeated herein.

The above descriptions are merely preferred embodiments of the present invention, and are not intended to limit the patent scope of the present invention. Any equivalent structure or equivalent flow transformation made by using the contents of the specification and the drawings of the present invention, or directly or indirectly applied to other related technical fields, should be likewise included in the patent protection scope of the present invention.

What is claimed is:

1. A radiator, wherein the radiator comprises a mounting portion used for mounting a heat source, a radiating portion connected with the mounting portion and used for absorbing heat transferred by the mounting portion, the radiating portion is internally provided with multiple radiating pipelines, the radiating pipelines are internally injected with liquid, and the liquid in the radiating pipelines is gasified after absorbing heat on one end where the radiating portion is close to the mounting portion, and in the radiating pipelines, moves from one end where the radiating portion is close to the mounting portion towards one end where the radiating portion is away from the mounting portion.

2. The radiator according to claim 1, wherein the radiating pipelines comprise a main pipeline unit disposed at the one end where the radiating portion is close to the mounting portion, multiple sub-pipeline units in communication with the main pipeline unit and a liquid injection pipeline in communication with the sub-pipeline units and located on the one end where the radiating portion is away from the mounting portion.

3. The radiator according to claim 2, wherein the multiple sub-pipeline units are spaced apart.

4. The radiator according to claim 2, wherein the profile of each of the sub-pipeline units is honeycomb-like.

5. A backlight module, wherein the backlight module comprises a body, and a radiator mounted into the body; the radiator comprises a mounting portion used for mounting a heat source, and a radiating portion connected with the mounting portion and used for absorbing heat transferred by the mounting portion, the radiating portion is internally provided with multiple radiating pipelines, the radiating pipelines are internally injected with liquid, and the liquid in the radiating pipelines is gasified after absorbing heat on one end where the radiating portion is close to the mounting portion, and in the radiating pipelines, moves from one end where the radiating portion is close to the mounting portion towards one end where the radiating portion is away from the mounting portion.

6. The backlight module according to claim 5, wherein the radiating pipelines comprise a main pipeline unit disposed at the one end where the radiating portion is close to the mounting portion, multiple sub-pipeline units in communication with the main pipeline unit and a liquid injection pipeline in communication with the sub-pipeline units and located on the one end where the radiating portion is away from the mounting portion.

7. The backlight module according to claim 6, wherein the multiple sub-pipeline units are spaced apart.

8. The backlight module according to claim 6, wherein the profile of each of the sub-pipeline units is honeycomb-like.

9. The backlight module according to claim 5, wherein the body comprises a back plate, a backlight source mounted in the back plate, and a light guide plate mounted in the back plate, the radiator is mounted on the back plate, and the backlight source is mounted on the radiator.

10. The backlight module according to claim 9, wherein the backlight source is glued to the radiator through a radiating glue.

11. The backlight module according to claim 10, wherein the backlight source is a linear LED light bar, the LED light bar comprises a PCB board and multiple LED lamps mounted and electrically connected to the PCB board, and the PCB board is glued to the radiator through the radiating glue.

12. The backlight module according to claim 9, wherein the backlight module further comprises a plastic frame mounted onto the back plate.

13. A display module, wherein the display module comprises a backlight module, a display panel mounted onto the backlight module, and a front frame mounted onto the display panel; the backlight module comprises a body, and a radiator mounted in the body; the radiator comprises a mounting portion used for mounting a heat source, and a radiating portion connected with the mounting portion and used for absorbing heat transferred by the mounting portion, the radiating portion is internally provided with multiple radiating pipelines, the radiating pipelines are internally injected with liquid, and the liquid in the radiating pipelines is gasified after absorbing heat on one end where the radiating portion is close to the mounting portion, and in the radiating pipelines, moves from one end where the radiating portion is close to the mounting portion towards one end where the radiating portion is away from the mounting portion.

14. The display module according to claim 13, wherein the radiating pipelines comprise a main pipeline unit disposed at the one end where the radiating portion is close to the mounting portion, multiple sub-pipeline units in communication with the main pipeline unit and a liquid injection pipeline in communication with the sub-pipeline units and located on the one end where the radiating portion is away from the mounting portion.

15. The display module according to claim 14, wherein the multiple sub-pipeline units are spaced apart.

16. The display module according to claim 14, wherein the profile of each of the sub-pipeline units is honeycomb-like.

17. The display module according to claim 13, wherein the body comprises a back plate, a backlight source mounted in the back plate, and a light guide plate mounted in the back plate, the radiator is mounted on the back plate, and the backlight source is mounted on the radiator.

18. The display module according to claim 17, wherein the backlight source is glued to the radiator through a radiating glue.

19. The display module according to claim 18, wherein the backlight source is a linear LED light bar, the LED light bar comprises a PCB board and multiple LED lamps mounted and electrically connected to the PCB board, and the PCB board is glued to the radiator through the radiating glue.

20. The display module according to claim 17, wherein the backlight module further comprises a plastic frame mounted onto the back plate.

\* \* \* \* \*